(12) United States Patent
Butler

(10) Patent No.: US 8,271,233 B2
(45) Date of Patent: Sep. 18, 2012

(54) METHOD OF MULTI-LEVEL FAULT ISOLATION DESIGN

(75) Inventor: Steven W. Butler, Columbia, CT (US)

(73) Assignee: United Technologies Corporation, Hartford, CT (US)

(*) Notice: Subject to any disclaimer, the term of this patent is extended or adjusted under 35 U.S.C. 154(b) by 1022 days.

(21) Appl. No.: 12/060,397

(22) Filed: Apr. 1, 2008

(65) Prior Publication Data

US 2009/0248363 A1 Oct. 1, 2009

(51) Int. Cl.
*G06F 11/30* (2006.01)
(52) U.S. Cl. ......... 702/185; 702/186; 702/187; 702/188
(58) Field of Classification Search .......... 702/185–190, 702/121
See application file for complete search history.

(56) References Cited

U.S. PATENT DOCUMENTS

| | | | |
|---|---|---|---|
| 4,649,515 A | 3/1987 | Thompson et al. | |
| 5,187,773 A | 2/1993 | Hamilton et al. | |
| 5,239,468 A | 8/1993 | Sewersky et al. | |
| 5,408,412 A | 4/1995 | Hogg et al. | |
| 5,522,014 A | 5/1996 | Clark et al. | |
| 5,727,000 A | 3/1998 | Pizzica | |
| 5,991,743 A | 11/1999 | Irving et al. | |
| 6,125,312 A | 9/2000 | Nguyen et al. | |
| 6,681,215 B2 | 1/2004 | Jammu | |
| 6,757,668 B1 * | 6/2004 | Goebel et al. | 706/59 |
| 6,909,960 B2 | 6/2005 | Volponi et al. | |
| 7,233,884 B2 | 6/2007 | Volponi | |
| 7,260,501 B2 | 8/2007 | Pattipatti et al. | |
| 7,260,505 B2 | 8/2007 | Felke et al. | |
| 2004/0148940 A1 * | 8/2004 | Venkateswaran et al. | 60/772 |
| 2007/0088982 A1 * | 4/2007 | Guralnik et al. | 714/26 |

* cited by examiner

*Primary Examiner* — Phuong Huynh
(74) *Attorney, Agent, or Firm* — Carlson, Gaskey & Olds, P.C.

(57) ABSTRACT

A fault isolation method and system includes tailored fault isolators for each grouping of similar data to differentiate between one or several potential faults within any group.

12 Claims, 3 Drawing Sheets

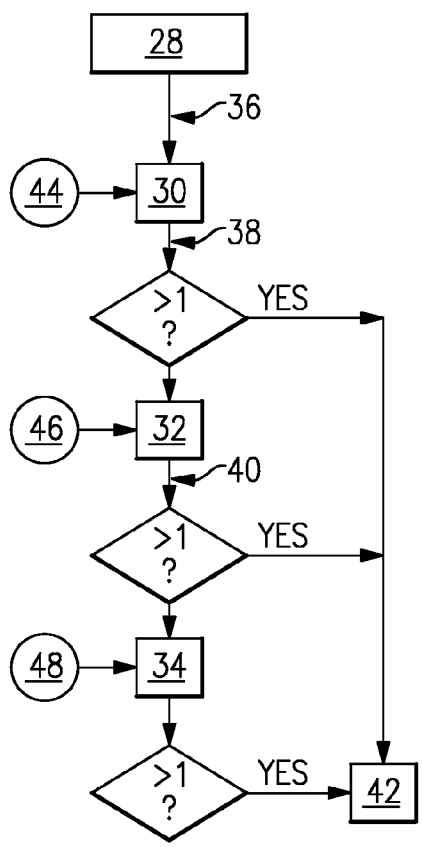
FIG.2
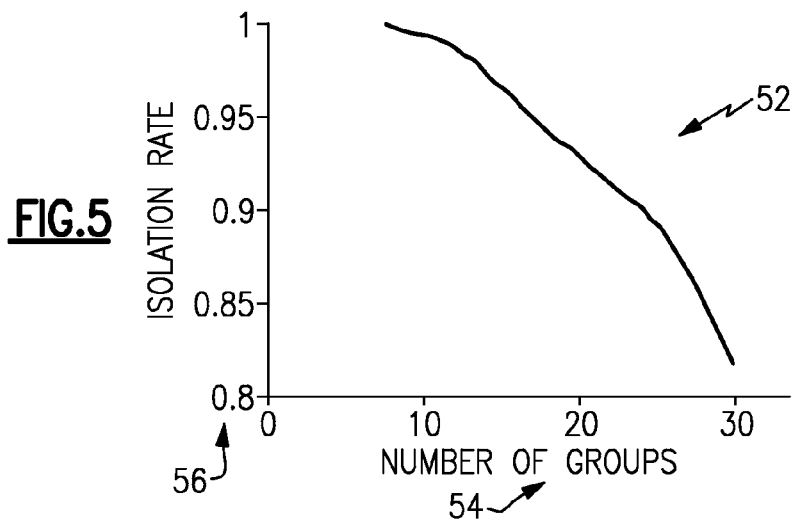
FIG.3
FIG.4
FIG.5

METHOD OF MULTI-LEVEL FAULT ISOLATION DESIGN

BACKGROUND OF THE INVENTION

This disclosure relates to a system and method of identifying a fault condition. More particularly, this disclosure relates to a system and method of identifying fault conditions utilizing limited actual data.

A modern aircraft engine typically includes as few as eight sensors along a gas path. Data from these sensors is utilized to identify specific faults based on different measured data from combinations of the sensors. Some combinations of faults are difficult to distinguish from each other. Further, the relative lack of data is compounded by sensor noise experienced during flight. For this reason, condition based monitoring system are utilized to isolate the location and cause of a fault.

Condition based monitoring systems typically utilize one many different classification algorithms. Classification algorithms include physics based models, empirical neural networks and knowledge based systems. Each classification scheme has strengths and weakness. For example the physics based models rely on a liner relationship between measurements. However, linear relationships cannot account for non-linear measurements such as can be provided by vibration or oil related sensors. Empirical neural networks are prone to overtraining that can cause questionable results if anything changes with regard to a fault conditions and require large amounts of data to provide adequate coverage of all fault conditions. Additionally, knowledge based systems, like the empirical neural networks rely on knowledge gained through experience in operating a particular system or engine and as such is not useful for newer systems.

Accordingly, it is desirable to develop a fault isolation system and method that improves over current methods that is adaptable to different systems and applications.

SUMMARY OF THE INVENTION

The disclosed fault isolation method and system includes tailored fault isolators for each grouping of similar data to differentiate between one or several potential faults within any group.

The disclosed fault isolation method and system includes selected fault isolators for each different grouping of similar data. Each fault isolator utilizes one of many different methods for evaluating and differentiating between fault conditions within a fault group. Each fault isolator is selected based on an analysis of performance based on sampling of know sensor data indicative of known fault conditions. The performance of each fault isolator is quantified for each of the many potential fault conditions and utilized to form groups of similar potential faults. The process is repeated to select a fault isolator from many different schemes and methods for each group including more than one fault condition. The defined system is then stored and utilized in the analysis of sensor data from a gas-turbine engine or other system to focus maintenance efforts.

The example fault isolator system and method selects from many different classification methods for classifying each group and sub-group based on the performance analysis.

Accordingly, the example fault isolation method and system provides fault isolators tailored and proven to differentiate between fault conditions within a defined group of potential faults.

These and other features of the present invention can be best understood from the following specification and drawings, the following of which is a brief description.

BRIEF DESCRIPTION OF THE DRAWINGS

FIG. 2 is a flow diagram illustrating an example method of isolating a fault condition.

FIG. 3 is an example chart for quantifying fault isolator performance.

FIG. 4, is another example chart for quantifying fault isolator performance.

FIG. 5 is a chart illustrating an example relationship between a number of different groups and a realized benefit.

DETAILED DESCRIPTION OF THE PREFERRED EMBODIMENT

Figure 1:
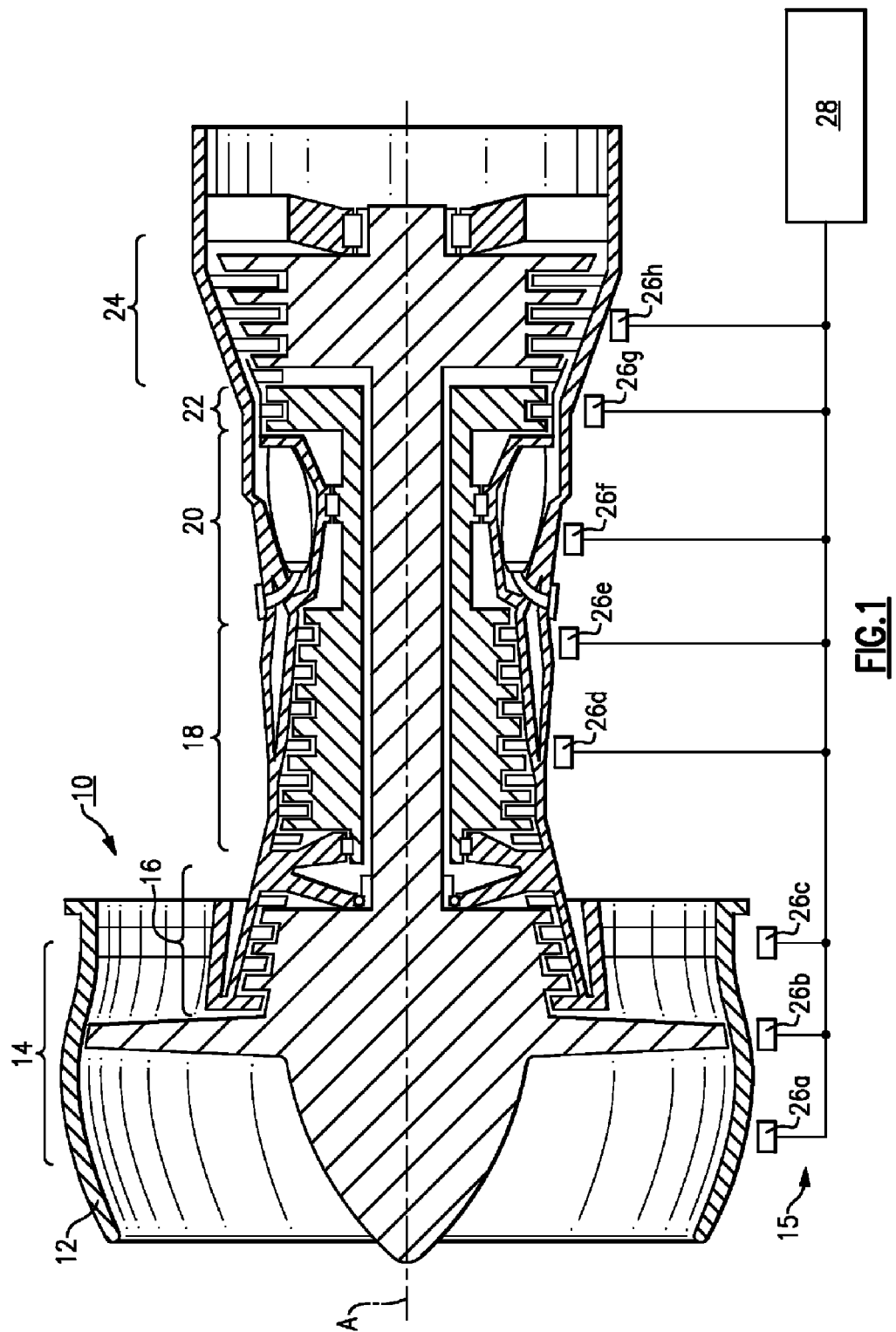
FIG. 1 is a schematic view of an example gas turbine engine.

Referring to FIG. 1, a gas turbine engine 10, such as the illustrated turbofan gas turbine engine, is circumferentially disposed about an engine centerline A. The engine 10 includes an inlet module 12, a fan module 14, a low pressure compressor module 16, a high pressure compressor module 18, a combustion module 20, a two stage high pressure turbine module 22, and a low pressure turbine module 24. Each module typically includes a multitude of components. It should be understood that this schematic view is included to provide a basic understanding of the modules of the gas turbine engine, and not to limit the invention as this disclosure extends to all types of systems.

The example gas turbine engine 10 includes eight sensors 26a-h along the gas-path that provides information utilized to diagnose many different fault conditions. The eight sensors 26a-h measures various conditions that are indicative of engine operation. Combinations of measurements and values from the engine 10 as measured by the sensors 26a-h are utilized to classify and determine fault conditions. Although many fault conditions are detectable from the sensor data, the specific origin and cause of others can be difficult to isolate from similar causes and faults. The difficulty in isolating a fault conditions stems from the similarity of measurements that can be indicative of different fault conditions. The similarity can result in a misclassification of a fault condition.

The example fault isolation system and method provides for the detection and isolation of a specific fault condition by using different isolation parameters that are tailored to detect differences between specific conditions within a defined group. Further, the example method provides for the isolation of a cause of a fault through the use of data or fault specific isolation methods for each group of like fault conditions. Once the cause of a specific fault condition is identified, the corresponding maintenance task can be selected and preformed. The maintenance task can include adjustment, or replacement of a system or single part. In the disclosed example, maintenance of the gas turbine engine 10 is focused and directed based on the fault identified by the fault isolation system.

The example fault isolation system and method is utilized as a diagnostic tool to direct attention to specific locations of the gas turbine engine 10. The sensors 26a-h communicates information to a fault isolator system 28. The fault isolator system 28 records and stores information that is utilized for isolating the fault condition and directing maintenance efforts. The example fault isolator 28 is schematically illustrated as connected to the sensors 26a-h.

It should be noted that a computing device can be used to implement various functionality of the disclosed fault isolation method and system. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

It should also be understood that it is within the contemplation of this invention that the fault isolator 28 can be an onboard data gathering and recoding device, or can be a separate device that is placed in communication with the gas-turbine engine 10 during maintenance operations.

Referring to FIG. 2, with continued reference to FIG. 1, the fault isolator 28 utilizes the data generated from the sensors 26a-h, to generate a group of possible fault conditions. The term isolator and classifier are both utilized in this application to denote a method, system or any other scheme for differentiating between at least two different potential fault conditions. The types of fault isolators can be selected from any known physics-based, knowledge-based and empirical-based algorithms. The group of possible fault conditions can include all possible fault conditions, or can include some subgroup that has been pre-sorted. The generated group of possible fault conditions is produced as an output group 36 that is input into a first node 30 of the example system 15.

The first node 30 is where a first isolator 44 is utilized to further isolate or classify the potential fault conditions within the output group 36. The example output group 36 includes all possible fault conditions. The first isolator 44 includes an isolation criteria utilized to separate possible faults indicated by the sensor data from those that are not indicated by the sensor data. The classification or isolation of fault conditions can be based on many different parameters, sensor data, or models. For example, the fault isolator may include a physics based model that uses known engine operating parameters to narrow possible faults. Further, the fault isolator can include an empirical neural network or a knowledge based system compiled from historic data of particular engine operation, or any other known classification or isolation means. Each of these methods has strengths and weaknesses in classifying and discerning one fault condition from another.

The example first isolator 44 utilizes one of the known methods of isolating and discerning one fault condition from another based on the content of the fault conditions in the output group 36. The first isolator 44 separates possible faults from those not possible based on the fault conditions, gathered data or other criteria utilized as the first fault isolator 44. A potential output group 38 is communicated to a second node 32 unless the potential output group 38 has been narrowed to one possible fault.

At the second node 32 receives the output group 38 that includes a number of fault conditions that could not be isolated or differentiated from the other potential faults in that group with the first isolator 44. The second isolator 46 is different from the first isolator 44 and utilizes analysis criteria capable of discerning between at least two of the potential fault conditions that make up the output group 38. The second isolator 46 can include any known method, model, sensor data, or criteria capable of discerning between fault conditions in the output group 38.

The resulting isolated fault conditions are generated as an output group 40 that is communicated through to a third node 34. If the output group 40 includes only a single fault condition 42 then the fault condition 42 has been isolated and no further analysis is required. However, if more than one potential fault condition is present, that group is sent to the third node 34. At the third node 34, a third isolator 48 is utilized that is best suited to differentiate between potential faults within the output group 40. The third isolator 48 is different than the first and second isolators 44, 46 and is selected based on the potential faults included in the output group 40.

The example illustration includes three nodes, however this process continues through as many nodes are required to narrow the number of potential fault conditions to a single fault condition. Each node 30 may be capable of discerning many different fault conditions with a desired accuracy and therefore require fewer nodes. Additionally, the selection of potential fault conditions can provide a trigger in which to select which of several subsequent nodes are utilized to further narrow and discern the potential fault conditions.

The use of different node specific isolators for each group of data provides an isolator system providing a desired accuracy in determining and isolating similar fault conditions from the data provided. The selection of which classifier or isolator is best for each node is determined by assessing performance of each isolator based on sample sensor data indicative of known fault conditions. This performance data is utilized to not only determine which isolator to use, but also to determine and group like fault conditions.

The process of selecting the desired isolator for a specific group of fault conditions begins with the analysis of the performance of the classifier based on a set of labeled sensor patterns from real or modeled data. The sensor patterns represent known patterns that are indicative of a specific known fault condition.

Referring to FIG. 3, data from this analysis is compiled in a contingency table 50. In the contingency table 50, the frequency of possible outcomes is utilized to provide a measure of confidence in any fault isolator. Possible outcomes include a detected fault, a missed fault, a false detection and a correct rejection of a fault condition. This data is compiled for a unique fault isolator and an analysis conducted to group and determines which fault isolators are best suited for a group of ambiguous potential fault conditions.

Referring to FIG. 4, an example table 55 is shown expanded to accommodate other possible combinations and numbers of potential fault conditions. The example table 55 includes five classes. The columns represent the actual fault present in a number of test cases. The rows represent the corresponding prediction from the classification system to each case.

The information compiled in the example contingency table 55 is utilized to group like fault conditions. Like fault conditions are those potential fault conditions that are not distinguished to a desired confidence between a fault isolator. The similarities of the fault conditions are quantified to extract apparent similarities and the real special proximity of so that a proper fault isolator can be selected from for each grouping. This analysis, in one example performed using an analysis including a first step of determining a similarity between data within the contingency table 55, and then grouping the most similar potential faults until the performance gain of adding additional potential faults to any one grouping is no longer significant.

The similarity between each of the fault classes compiled in the contingency table 55 is determined using known equations for determining a distance of data within a matrix. Example distance equations include Euclidean and Hamming distance equations as well as any other known method or equation. The differences between fault classes quantify the similarity of each potential fault are utilized for grouping. The smaller distance as determined by the known equations is indicative of an increased difficulty in discerning differences between fault pairs or groups. Conversely, fault classes that are further apart are easier to differentiate.

Once the distance between fault classes are quantified, the fault classes are grouped. The groupings are compiled to include those potential faults that a particular evaluated isolator can differentiate from any potential faults outside of the group. Accordingly, a first isolator may be utilized to differentiate between many other faults groups. This process begins with each potential fault being placed in a group including only one fault condition. The two most similar fault conditions are then combined into one group. This group is then compared to the next most similar and combined.

Referring to FIG. 5, an example graph 52 provides a relationship between the number of fault conditions 54 included in any group and the isolation rate 56. The process continues until such time as the utility of combining additional groups is below a desired threshold. The threshold represents the increased efficiency gained by including the additional potential fault in any group. Beyond the threshold, adding additional potential fault groups does not provide a benefit.

Once the first fault isolator is complete by this process, another group is formed using data compiled from analysis of another fault isolator that is able to differentiate fault groups that are not otherwise discernable by the first fault isolator. Grouping is accomplished with all of the groups at one time. During each grouping iteration, all groups and faults are compared and the two closest are combined. The next step is again performed over all faults and the next combination may or may not include the group created in the last iteration.

Figure 6:
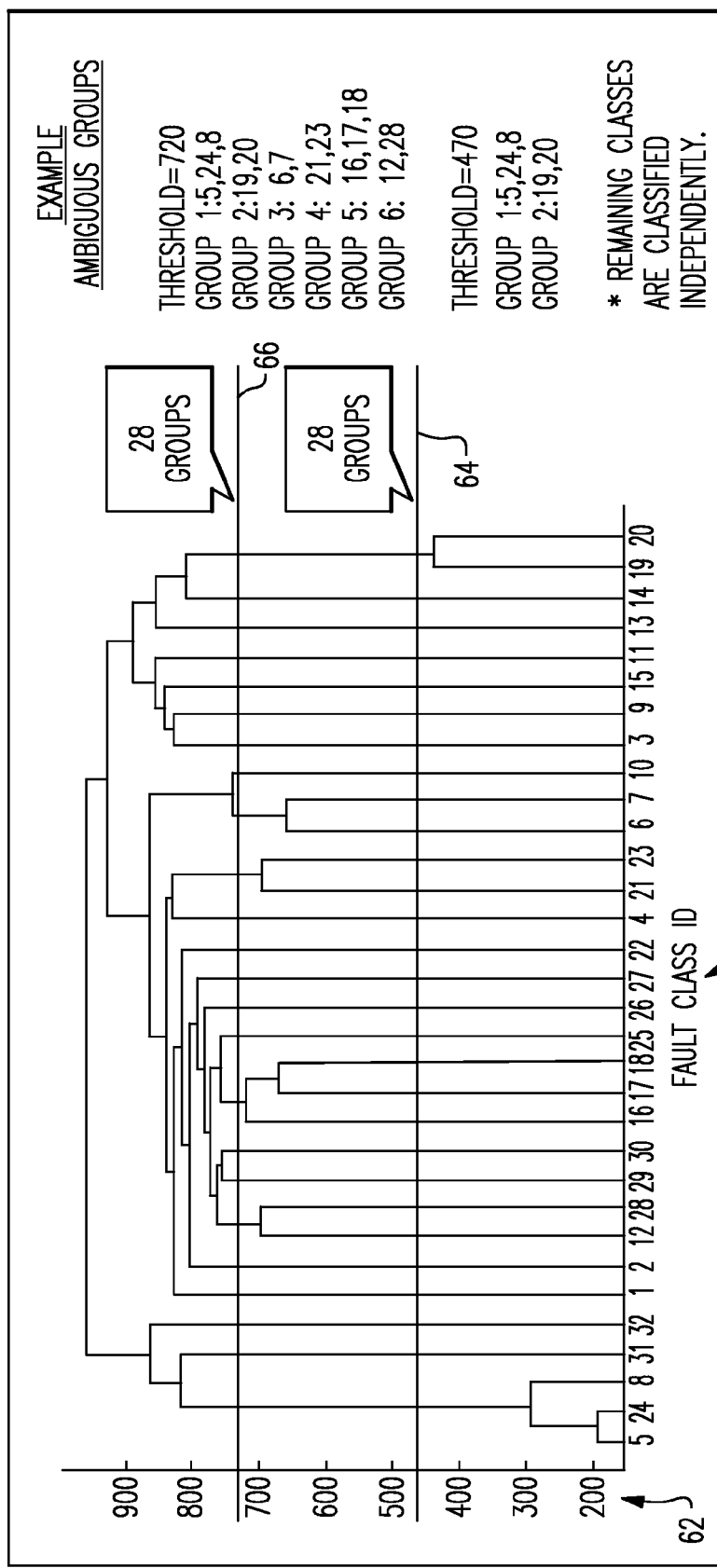
FIG. 6 is an example chart illustrating groupings of potential fault conditions.

Referring to FIG. 6, the grouping or clustering process is visually represented by the example dendogram graph 58. The graph 58 includes a number of potential faults 60 that are clustered together based on a distance 62. The distance 62 represents relative similarities between each potential fault. Line 64 represents a grouping based on one threshold value that results in a grouping of only a few potential fault groups. The remaining individual faults are separately isolatable by the isolator. Each group would require at least one additional isolator to further narrow the number of potential faults to one.

Line 66 represents a higher threshold value representing a more aggressive grouping requiring a higher confidence in the ability of any isolator to determined differences between the groupings. As is apparent from the graph 58, the higher threshold of confidence results in the need for more fault isolators to differentiate potential faults within the increased number of groups. Graph 58 is a method of visualizing the clusters, not of performing the clustering. It is used after the clustering has been performed to review the effects of the clustering and is considered when choosing how aggressively to cluster.

As appreciated, it is within the contemplation of this invention to group potential faults according to any known method or selection criteria. However the groupings are generated based on the level of confidence in the isolator utilized to differentiate between potential faults within that group. This method constructs the grouping based on the performance analysis of a specific fault isolator and thereby tailors the fault isolation to the specific characteristics of the potential fault groups. Each group is compiled based on the performance of the fault isolator in order to match the proper and desired fault isolator with the potential fault groupings that the fault isolator is best qualified to differentiate.

The isolation method as illustrated in FIG. 2 is therefore generated by analysis of the performance of several different fault isolators to determine which provides the desired differentiation between several different potential faults. The process of selecting the fault isolators for each node is accomplished by evaluating known sensor data that is indicative of a plurality of known fault conditions.

The performance of the fault isolator is quantified and utilized to generate groupings. The groupings are made based on the capability and performance of the fault isolator to differentiate between fault conditions. The groupings are further made based on the point where further consolidation of fault conditions does not improve performance as desired. The relationship between the number of groups and performance can be illustrated in graphical form as shown by the graph 52 of FIG. 5. Selection of the fault isolator is based on the ability to maintain the greatest level of isolation performance while distinguishing between as many potential faults as is possible within the desired performance thresholds. Once the first fault isolator is chosen, additional nodes are defined and accompanying fault isolators chosen. The process continues for each fault group including more than one potential fault.

Once each node is defined, the fault isolator 28 will isolate faults from the received sensor data. With each node and fault isolator is selected such that all groups narrow to a single fault, the system is recorded and saved for reference during maintenance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of isolating a fault condition from many potential fault conditions comprising:

receiving a plurality of measured parameters indicative of a physical operating condition with a receiver;

generating a first group of potential faults with a controller receiving data from the receiver based on the plurality of input measured parameters by clustering individual potential faults together responsive to similarities in fault behavior within a defined range according to a defined acceptance criteria, wherein the defined acceptance criteria includes a capability of identifying a difference discernable by a fault isolator between at least two of the potential faults within the generated group meets;

selecting a first fault isolator with the controller from a plurality of fault isolators based on performance of the first fault isolator in differentiating between potential faults within the first group of potential faults;

applying the first isolator with the controller to the first group of potential faults to determine that at least one of the potential faults within the first group is not possible based on an evaluation conducted by the first fault isolator in differentiating between potential faults such that a second group that includes fewer potential faults than the first group of potential faults is generated based on an evaluation of each of the potential faults within the first group conducted by the first fault isolator; and communicating a fault condition with a communication device responsive to the redefined group of potential faults including one potential fault.

2. The method as recited in claim 1, including the step of selecting a second isolator different than the first isolator from the plurality of isolators with the controller responsive to the redefined group including more than one potential fault, wherein the second isolator is selected based on performance of the second isolator in differentiating between potential faults in the redefined group of potential faults.

3. The method as recited in claim 1, wherein the group of potential faults is generated by clustering individual potential faults together responsive to similarities in fault behavior within a defined range.

4. The method as recited in claim 3, wherein similarities in fault behavior are quantified by measuring differences between fault classes within a confusion matrix.

5. A method of isolating a fault condition from many potential fault conditions comprising:
receiving a plurality of measured parameters indicative of a physical operating condition with receiver;
generating a first group of potential faults with a controller based on the plurality of input measured parameters from the receiver, wherein the group of potential faults is generated by clustering individual potential faults together responsive to similarities in fault behavior within a defined range;
selecting a first isolator within the controller from a plurality of isolators based on performance of the first isolator in differentiating between fault behavior within the defined range of faults within the first group of potential faults;
applying the first isolator to the group of potential faults to eliminate at least one of the potential faults within the first group based on differentiating between fault behavior by the first isolator such that a second group is generated that includes fewer potential faults than a previous first group of potential faults based on evaluations of each of the potential faults conducted by the first isolator; and
communicating a fault condition with a communication device responsive to the redefined group of potential faults including one potential fault, wherein the group of potential faults is accepted responsive to a difference discernable by the first isolator between at least two potential faults being within a desired acceptance criteria.

6. The method as recited in claim 5, wherein the acceptance criteria comprises a desired frequency of obtaining a correctly identified fault condition.

7. The method as recited in claim 5, wherein the acceptance criteria comprises a desired frequency of obtaining a correctly consolidated group.

8. The method as recited in claim 1, including the step of performing a maintenance operation on a mechanical system corresponding with the reported fault condition.

9. A fault isolator for determining a fault condition of a system comprising:
a receiver for receiving parameter data indicative of system performance;
a controller receiving data from the receiver, the controller including,
a first isolator for differentiating between at least two potential faults from a group of potential faults indicated by the received data;
a second fault isolator different than the first isolator for differentiating between potential faults not discernable by the first isolator, wherein the first isolator and the second fault isolator are selected responsive to a determined ability to discern between at least two potential faults within a group of potential faults; and
a communication device for communicating the fault condition determined by criteria of the first and second isolators.

10. The fault isolator as recited in claim 9, wherein the first isolator comprises a model of the system utilized for discerning between at least two of the potential faults from the group of potential faults.

11. The fault isolator as recite in claim 10, wherein the second isolator comprises a model of the system different than the model of the system utilized for the first isolator.

12. A fault isolator for determining a fault condition of a system comprising:
a receiver for receiving parameter data indicative of system performance;
a controller receiving data from the receiver, the controller including,
a first isolator for differentiating between at least two potential faults from a group of potential faults indicated by the received data;
a second fault isolator different than the first isolator for differentiating between potential faults not discernable by the first isolator; and
a communication device for communicating the fault condition determined by eliminating potential fault conditions by differentiating between a group of potential faults with the first and second isolators, wherein each of the first fault isolator and the second fault isolator are selected based on a previously tested capability of differentiating between potential fault conditions within a sample set of data indicative of system performance and indicative of known fault conditions.

* * * * *